US012633129B2

(12) United States Patent
Hu et al.

(10) Patent No.: US 12,633,129 B2
(45) Date of Patent: May 19, 2026

(54) METHOD AND SYSTEM FOR AUTOMATIC DRIVING DATA COLLECTION AND CLOSED-LOOP MANAGEMENT

(71) Applicants:Zhejiang Geely Holding Group Co., Ltd, Hangzhou (CN); GEELY AUTOMOBILE RESEARCH INSTITUTE (NINGBO) CO., LTD, Ningbo (CN)

(72) Inventors: Yue Hu, Hangzhou (CN); Kun Deng, Hangzhou (CN); Jianfeng Zhang, Hangzhou (CN); Xinyu Zheng, Hangzhou (CN)

(73) Assignees: Zhejiang Geely Holding Group Co., Ltd., Hangzhou (CN); GEELY AUTOMOBILE RESEARCH INSTITUTE (NINGBO) CO., LTD., Ningbo (CN)

( * ) Notice: Subject to any disclaimer, the term of this patent is extended or adjusted under 35 U.S.C. 154(b) by 358 days.

(21) Appl. No.: 18/255,360

(22) PCT Filed: Dec. 1, 2020

(86) PCT No.: PCT/CN2020/133062
§ 371 (c)(1),
(2) Date: May 31, 2023

(87) PCT Pub. No.: WO2022/115987
PCT Pub. Date: Jun. 9, 2022

(65) Prior Publication Data
US 2023/0419683 A1     Dec. 28, 2023

(51) Int. Cl.
*G06N 3/0442* (2023.01)
*G06N 3/092* (2023.01)
(Continued)

(52) U.S. Cl.
CPC .............. *G06V 20/58* (2022.01); *G06V 10/30* (2022.01); *G06V 10/82* (2022.01); *G06V 20/588* (2022.01); *G07C 5/008* (2013.01)

(58) Field of Classification Search
CPC ........ G06V 20/58; G06V 10/30; G06V 10/82; G06V 20/588; G07C 5/008; G07C 5/085;
(Continued)

(56) References Cited

U.S. PATENT DOCUMENTS

2018/0188039 A1* 7/2018 Chen ......................... G06T 7/11
2018/0284803 A1* 10/2018 Lee ............................ G06T 7/70
(Continued)

FOREIGN PATENT DOCUMENTS

CN       108243216 A     7/2018
CN       108909833 A     11/2018
(Continued)

OTHER PUBLICATIONS

Extended European Search Report from corresponding European Application No. EP20963836.0, dated Oct. 7, 2024.
(Continued)

*Primary Examiner* — Andrew M Moyer
*Assistant Examiner* — Dylan John Mendez Muniz

(57) ABSTRACT

Provided are a method and system for automatic driving data collection and closed-loop management. The method includes: obtaining vehicle driving data; preprocessing the vehicle driving data; obtaining incremental data by filtering, through a pre-trained neural network based on a predetermined filtering rule, the preprocessed vehicle driving data; and storing the incremental data or transmitting the incremental data to a cloud. The method can effectively filter high-value incremental data, thereby reducing requirements for data storage volume and/or data transmission bandwidth of the system. The system of the present disclosure can be (Continued)

post-mounted or pre-mounted on a vehicle, and is independent of specific vehicle type of the vehicle. In addition, it is not necessary for the vehicle to be equipped with real-value systems such as high-cost laser radars, which greatly improves use convenience of the system and facilitates rapid and large-scale application.

17 Claims, 5 Drawing Sheets

(51) Int. Cl.

| | |
|---|---|
| *G06V 10/30* | (2022.01) |
| *G06V 10/82* | (2022.01) |
| *G06V 20/56* | (2022.01) |
| *G06V 20/58* | (2022.01) |
| *G07C 5/00* | (2006.01) |

(58) Field of Classification Search
CPC ...... G06N 3/0442; G06N 3/006; G06N 3/092; B60W 60/001; B60W 2050/065
See application file for complete search history.

(56) References Cited

U.S. PATENT DOCUMENTS

| | | | | |
|---|---|---|---|---|
| 2018/0365533 | A1* | 12/2018 | Sathyanarayana | ....... G06N 3/09 |
| 2019/0146478 | A1* | 5/2019 | Cella | ...................... G06N 20/00 |
| | | | | 702/188 |
| 2019/0384303 | A1* | 12/2019 | Muller | ................... G06N 20/00 |
| 2020/0175333 | A1 | 6/2020 | Viswanathan | |
| 2023/0030496 | A1* | 2/2023 | Pang | ...................... G06V 20/46 |

FOREIGN PATENT DOCUMENTS

| | | | |
|---|---|---|---|
| CN | 109873921 | A | 6/2019 |
| CN | 110188683 | A | 8/2019 |
| CN | 110705684 | A | 1/2020 |
| CN | 110796157 | A | 2/2020 |
| CN | 110832279 | A | 2/2020 |

OTHER PUBLICATIONS

International Search Report dated Aug. 30, 2021 in International Application No. PCT/CN2020/133062. English translation attached. First Office Action dated Feb. 26, 2025 received in corresponding patent family application No. CN202080107696.1. English translation attached.

* cited by examiner

S102

Obtaining vehicle driving data

S104

Preprocessing the vehicle driving data

S106

Obtaining incremental data by filtering, through a pre-trained neural network based on a predetermined filtering rule, the preprocessed vehicle driving data

S108

Storing the incremental data, or transmitting the incremental data to a cloud

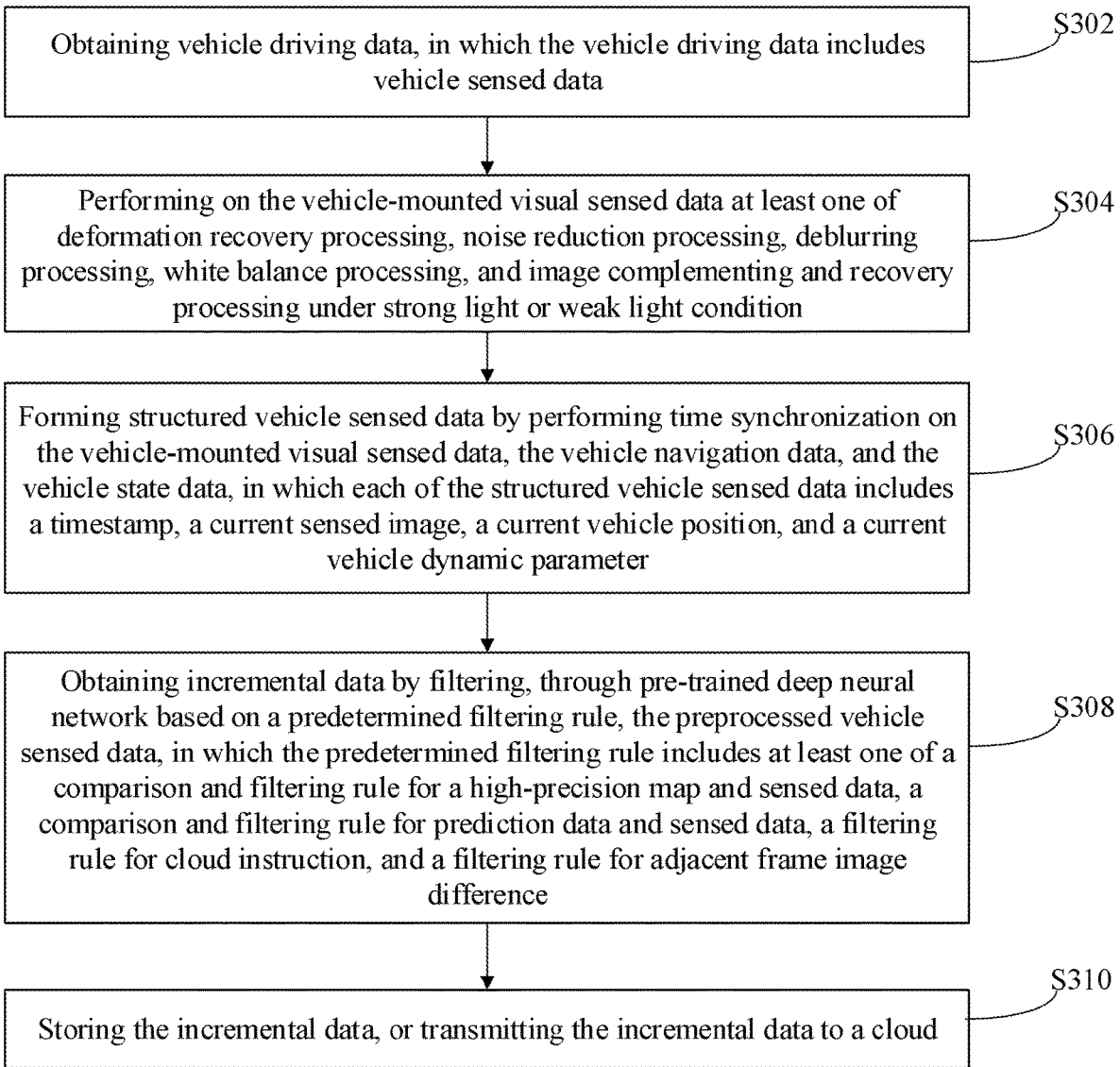

Obtaining vehicle driving data, in which the vehicle driving data includes vehicle sensed data                                         S302

Performing on the vehicle-mounted visual sensed data at least one of deformation recovery processing, noise reduction processing, deblurring processing, white balance processing, and image complementing and recovery processing under strong light or weak light condition                                         S304

Forming structured vehicle sensed data by performing time synchronization on the vehicle-mounted visual sensed data, the vehicle navigation data, and the vehicle state data, in which each of the structured vehicle sensed data includes a timestamp, a current sensed image, a current vehicle position, and a current vehicle dynamic parameter                                         S306

Obtaining incremental data by filtering, through pre-trained deep neural network based on a predetermined filtering rule, the preprocessed vehicle sensed data, in which the predetermined filtering rule includes at least one of a comparison and filtering rule for a high-precision map and sensed data, a comparison and filtering rule for prediction data and sensed data, a filtering rule for cloud instruction, and a filtering rule for adjacent frame image difference                                         S308

Storing the incremental data, or transmitting the incremental data to a cloud                                         S310

FIG. 3

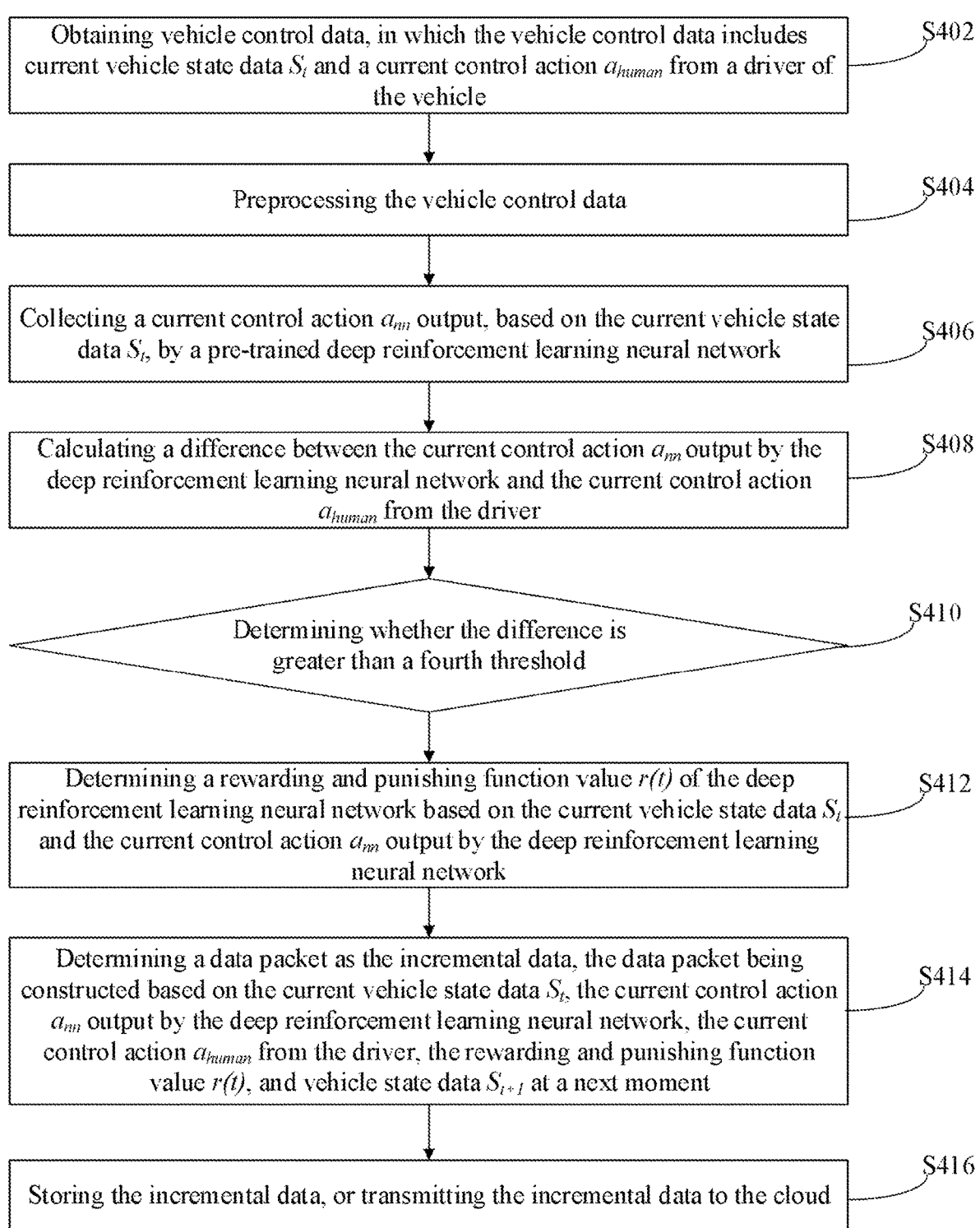

Obtaining vehicle control data, in which the vehicle control data includes current vehicle state data $S_t$ and a current control action $a_{human}$ from a driver of the vehicle — S402

Preprocessing the vehicle control data — S404

Collecting a current control action $a_{nn}$ output, based on the current vehicle state data $S_t$, by a pre-trained deep reinforcement learning neural network — S406

Calculating a difference between the current control action $a_{nn}$ output by the deep reinforcement learning neural network and the current control action $a_{human}$ from the driver — S408

Determining whether the difference is greater than a fourth threshold — S410

Determining a rewarding and punishing function value $r(t)$ of the deep reinforcement learning neural network based on the current vehicle state data $S_t$ and the current control action $a_{nn}$ output by the deep reinforcement learning neural network — S412

Determining a data packet as the incremental data, the data packet being constructed based on the current vehicle state data $S_t$, the current control action $a_{nn}$ output by the deep reinforcement learning neural network, the current control action $a_{human}$ from the driver, the rewarding and punishing function value $r(t)$, and vehicle state data $S_{t+1}$ at a next moment — S414

Storing the incremental data, or transmitting the incremental data to the cloud — S416

FIG. 4

METHOD AND SYSTEM FOR AUTOMATIC DRIVING DATA COLLECTION AND CLOSED-LOOP MANAGEMENT

FIELD

The present disclosure relates to the field of automatic driving technologies, and in particular, to a method and system for automatic driving data collection and closed-loop management.

BACKGROUND

In recent years, automatic driving technology develops quickly. However, large-scale deployment of autonomous vehicles is still limited by sensor cost and sensed decision-making algorithm capability. The sensed decision-making algorithm capability depends on performance of a neural network such as a Deep Neural Network (DNN) used, and the performance of the neural network relies on collection and accumulation of automatic driving data.

Current automatic driving data are generally collected using the following two methods: one is to collect sensed data by using a professional data collection vehicle and a road test vehicle; and another is to deploy a data collection system on a mass production vehicle and to upload vehicle sensed data, vehicle state data, and vehicle control data to a cloud after predetermined processing is performed on the vehicle sensed data, the vehicle state data, and the vehicle control data. However, on one hand, performing data collection by using the collection vehicle and the road test vehicle in a large number of drive tests is confronted with problems like a small collection scene range, a large collection quantity of bicycle data, a large quantity of redundant data records, and the need for a true value system such as a laser radar. On the other hand, in the data collection, exploring valuable data has a gradually increasing cost, enabling an average value density of the data to become sparser, thereby resulting in higher collection cost. The data is collected using the mass production vehicle, which enriches quantity and diversity of the data, and significantly saves the collection cost of data. However, in data that is currently transmitted back to the cloud via T-box, and the like, most automobile enterprises still take numerical data like dynamic parameters of a vehicle and dynamic parameters of a power system as main data, and do not support collection and return of data like images and videos, which are not enough to support training of DNN of automatic driving sensed and decision-making system, and still have the problem of high-value data filtering. Tesla preliminarily explores the deployment of the data collection system in the mass production vehicle, and filters the high-value data in a manner including a "shadow mode", a data scoring mechanism, and the like. However, Tesla does not specify its high-value data filtering mechanism, which may have a high requirement for a system transmission bandwidth and a complex system design. Therefore, combining an automatic driving scene with vehicle advantages of a vehicle enterprise, for the need of improving performance of DNN of automatic driving sensed and decision-making system, how to design a scheme for incremental high-value data collection and closed loop that is effective and applicable on large scale becomes an urgent technical problem to be solved in the related art.

SUMMARY

In view of the above, the present disclosure is proposed to overcome the above problems or at least partially solve the above problems. To this end, the present disclosure provides a method and system for automatic driving data collection and closed-loop management.

According to embodiments of the present disclosure, there is provided a method and system for automatic driving data collection and closed-loop management, which can effectively filter high-value incremental data.

According to embodiments of the present disclosure, a neural network of a sensed decision-making system of automatic driving is trained with filtered incremental data, and a pre-trained neural network is updated by deploying the trained neural network for data collection, to form closed-loop management of the incremental data targeted at improving a neural network sensed capability.

According to one embodiment of the present disclosure, a method for automatic driving data collection and closed-loop management is provided. The method is applied in a vehicle and includes: obtaining vehicle driving data; pre-processing the vehicle driving data; obtaining incremental data by filtering, through a pre-trained neural network based on a predetermined filtering rule, the preprocessed vehicle driving data; and storing the incremental data, or transmitting the incremental data to a cloud.

In some embodiments of the present disclosure, the method further includes, subsequent to storing the incremental data: updating the pre-trained neural network by receiving and deploying a trained neural network issued from the cloud. The trained neural network is a neural network trained with the incremental data.

In some embodiments of the present disclosure, the vehicle driving data includes vehicle sensed data. The neural network is a deep neural network.

In some embodiments of the present disclosure, the vehicle sensed data includes vehicle-mounted visual sensed data. The preprocessing the vehicle driving data includes: performing on the vehicle-mounted visual sensed data at least one of deformation recovery processing, noise reduction processing, deblurring processing, white balance processing, and image complementing and recovery processing under strong light or weak light condition.

In some embodiments of the present disclosure, the vehicle sensed data further includes vehicle navigation data and vehicle state data. The preprocessing the vehicle driving data further includes: forming structured vehicle sensed data by performing time synchronization on the vehicle-mounted visual sensed data, the vehicle navigation data, and the vehicle state data. Each of the structured vehicle sensed data includes a timestamp, a current sensed image, a current vehicle position, and a current vehicle dynamic parameter.

In some embodiments of the present disclosure, the predetermined filtering rule includes at least one of a comparison and filtering rule for a high-precision map and sensed data, a comparison and filtering rule for prediction data and sensed data, a filtering rule for cloud instruction, and a filtering rule for adjacent frame image difference.

In some embodiments of the present disclosure, the comparison and filtering rule for the high-precision map and the sensed data includes: identifying the structured vehicle sensed data by running the pre-trained neural network to obtain identification data; determining whether current identification data includes a marked target road infrastructure in the high precision map in response to a forward distance of the vehicle from the marked target road infrastructure being smaller than a first threshold; and determining structured vehicle sensed data of a predetermined number of frames as the incremental data in response to determining that the current identification data includes no marked target road infrastructure in the high precision map. The structured vehicle sensed data of the predetermined number of frames includes previous structured vehicle sensed data and subsequent structured vehicle sensed data that are directly adjacent to current structured vehicle sensed data.

In some embodiments of the present disclosure, the comparison and filtering rule for the prediction data and the sensed data includes: predicting a first position of an obstacle vehicle in a first number of future frames starting from a current moment; obtaining an actually sensed second position of the obstacle vehicle in a second number of future frames starting from the current moment through the pre-trained neural network based on structured vehicle sensed data of the second number of future frames starting from the current moment, in which the second number is greater than or equal to the first number; determining whether the prediction data is same as the sensed data based on the first position in each of the future frames and the second position in a corresponding frame; and determining structured vehicle sensed data of a predetermined number of frames as the incremental data in response to determining that the sensed data is different from the sensed data based on the first position in each of the future frames and the second position in a corresponding frame. The structured vehicle sensed data of the predetermined number of frames includes previous structured vehicle sensed data and subsequent structured vehicle sensed data that are directly adjacent to current structured vehicle sensed data.

In some embodiments of the present disclosure, the determining whether the prediction data is same as the sensed data based on the first position in each of the future frames and the second position in the corresponding frame includes: calculating a distance difference d between the prediction data and the sensed data by a formula (1):

$$d = \frac{1}{n}\sum\nolimits_{i=1}^{n}\left(X_i^{real} - X_i^{pred}\right)^2 + \left(Y_i^{real} - Y_i^{pred}\right)^2, \tag{1}$$

where $$\left(X_i^{real}, Y_i^{real}\right)$$

represents an actually sensed second position of an obstacle vehicle in an i-th future frame, $$\left(X_i^{pred}, Y_i^{pred}\right)$$

represents a predicted first position of the obstacle vehicle in the i-th future frame, and n is equal to the first number; determining whether the distance difference d is greater than a second threshold; and determining that the prediction data is different from the sensed data in response to determining that the distance difference d is greater than the second threshold.

In some embodiments of the present disclosure, the filtering rule for the cloud instruction includes: obtaining the incremental data by filtering, based on a data filtering instruction issued from the cloud, the structured vehicle sensed data.

In some embodiments of the present disclosure, the filtering rule for the adjacent frame image difference includes: calculating a difference index between sensed images in structured vehicle sensed data in a previous frame and a subsequent frame that are adjacent to each other; determining whether the difference index is greater than a third threshold; and determining structured vehicle sensed data of a predetermined number of frames as the incremental data in response to determining that the difference index is greater than the third threshold. The structured vehicle sensed data of the predetermined number of frames includes previous structured vehicle sensed data and subsequent structured vehicle sensed data that are directly adjacent to the structured vehicle sensed data in the subsequent frame.

In some embodiments of the present disclosure, the difference index is a mean square error, and the calculating the difference index between the sensed images in the structured vehicle sensed data in the previous frame and the subsequent frame that are adjacent to each other includes: calculating a mean square error between the sensed images in the structured vehicle sensed data in the previous frame and the subsequent frame by a formula (2):

$$MSE = \frac{1}{mn}\sum\nolimits_{i=0}^{m-1}\sum\nolimits_{j=0}^{n-1}[I_t(i, j) - I_{t+1}(i, j)]^2, \tag{2}$$

where $I_t(i,j)$ represents a pixel value of sensed images in frames at a t moment, $$I_{t+1}(i, j)$$

represent a pixel value of sensed images in frames at a t+1 moment, i and j represent pixel point coordinates of the sensed image, respectively, and m and n represent a length and a width of the sensed image; or the difference index is structural similarity, and the calculating the difference index between the sensed images in the structured vehicle sensed data in the previous frame and the subsequent frame that are adjacent to each other includes: calculating a structural similarity between the sensed images in the structured vehicle sensed data in the previous frame and the subsequent frame by a formula (3):

$$SSIM(x, y) = \frac{(2\mu_x\mu_y + c_1)(2\sigma_{xy} + c_2)}{\left(\mu_x^2 + \mu_y^2 + c_1\right)\left(\sigma_x^2 + \sigma_y^2 + c_2\right)}, \tag{3}$$

where x and y represent pixel values of sensed images in two adjacent frames, $\mu_x$ represents a mean value of x, $\mu_y$ represents a mean value of y, $\sigma_x$ represents a variance of x, $\sigma_y$ represent a variance of y, $\sigma_{xy}$ represents a covariance of x and y; and $c_1$ and $c_2$ are constants that maintain stability, $c_1 = (k_1 * L)^2$, $c_2 = (k_2 * L)^2$, where $k_1$ and $k_2$ are constants, and L represents a dynamic range of the pixel values.

In some embodiments of the present disclosure, the vehicle driving data includes vehicle control data. The neural network is a deep reinforcement learning neural network.

In some embodiments of the present disclosure, the vehicle control data includes current vehicle state data $S_t$ and a current control action $a_{human}$ from a driver of the vehicle. The obtaining the incremental data by filtering, through the pre-trained neural network based on the predetermined filtering rule, the preprocessed vehicle driving data includes: collecting a current control action $a_{nn}$ output, based on the current vehicle state data $S_t$, by a pre-trained deep reinforcement learning neural network; calculating a difference between the current control action $a_{nn}$ output by the deep reinforcement learning neural network and the current control action $a_{human}$ from the driver; determining whether the difference is greater than a fourth threshold; determining a rewarding and punishing function value r(t) of the deep reinforcement learning neural network based on the current vehicle state data $S_t$ and the current control action $a_{nn}$ output by the deep reinforcement learning neural network, in response to determining that the difference is greater than the fourth threshold; and determining a data packet as the incremental data, in which the data packet is constructed based on the current vehicle state data $S_t$, the current control action $a_{nn}$ output by the deep reinforcement learning neural network, the current control action $a_{human}$ from the driver, the rewarding and punishing function value r(t), and vehicle state data $S_{t+1}$ at a next moment.

In some embodiments of the present disclosure, the determining the rewarding and punishing function value r(t) of the deep reinforcement learning neural network based on the current vehicle state data $S_t$ and the current control action $a_{nn}$ output by the deep reinforcement learning neural network includes: calculating the rewarding and punishing function value r(t) of the deep reinforcement learning neural network by a formula (4):

$$r(t)=R_{ca}(t)+b_1R_{ma}(t)+b_2R_{lk}(t)+b_3R_{speed}(t)+b_4R_{steer}(t) \qquad (4),$$

where $R_{ca}(t)$ represents to a collision avoidance index, $R_{ma}(t)$ represents a mission achievement index, $R_{lk}(t)$ represents a lane keeping capability index, $R_{speed}(t)$ represents a speed rationality index, $R_{steer}(t)$ represents a steering rationality index, $R_{ca}(t)$, $R_{ma}(t)$, $R_{lk}(t)$, $R_{speed}(t)$, and $R_{steer}(t)$ are obtained by applying the current control action $a_{nn}$ output by the deep reinforcement learning neural network to a control system of the vehicle based on the current vehicle state data $S_t$, and $b_1$, $b_2$, $b_3$, and $b_4$ represent weight coefficients, respectively.

In some embodiments of the present disclosure, the current vehicle state data $S_t$ includes at least one of current environment information, a current vehicle speed, and a current vehicle steering angle. The current control action $a_{human}$ from the driver includes at least one of a first decision instruction, a steering angle, and an accelerator pedal/brake pedal opening degree. The current control action $a_{nn}$ output by the deep reinforcement learning neural network includes at least one of a second decision instruction, a steering instruction, and a speed instruction.

In some embodiments of the present disclosure, the method further includes, prior to the obtaining the incremental data by filtering, through the pre-trained neural network based on the predetermined filtering rule, the preprocessed vehicle driving data: caching the preprocessed vehicle driving data.

According to one embodiment of the present disclosure, a system for automatic driving data collection and closed-loop management is provide. The system is applied in a vehicle and includes: a data obtaining unit configured to obtain vehicle driving data; a data processor including a data preprocessing module configured to preprocess the vehicle driving data and a data filtering module, in which a pre-trained neural network is deployed on the data filtering module, and the data filtering module is configured to obtain incremental data by filtering, through a pre-trained neural network based on a predetermined filtering rule, the preprocessed vehicle driving data; and a memory having the incremental data stored thereon; and/or a transmitting module configured to transmit the incremental data to a cloud.

In some embodiments of the present disclosure, the data filtering module is further configured to update the pre-trained neural network by receiving and deploying the trained neural network issued from the cloud. The trained neural network is a neural network trained with the incremental data.

In some embodiments of the present disclosure, the data obtaining unit includes one or more vehicle-mounted cameras configured to obtain vehicle-mounted visual sensed data. The data preprocessing module is further configured to perform on the vehicle-mounted visual sensed data at least one of deformation recovery processing, noise reduction processing, deblurring processing, white balance processing, and image complementing and recovery processing under strong light or weak light condition.

In some embodiments of the present disclosure, the data obtaining unit further includes a navigation device configured to obtain vehicle navigation data, and a vehicle network device configured to obtain vehicle state data. The data processor further includes a data synchronization module configured to form structured vehicle sensed data by performing time synchronization on the vehicle-mounted visual sensed data, the vehicle navigation data, and the vehicle state data. Each of the structured vehicle sensed data includes a timestamp, a current sensed image, a current vehicle position, and a current vehicle dynamic parameter.

In some embodiments of the present disclosure, the data processor further includes a data caching module configured to cache the preprocessed vehicle driving data.

In some embodiments of the present disclosure, the memory is a vehicle-mounted mobile hard disk.

In the method and system for the automatic driving data collection and closed-loop management according to the embodiments of the present disclosure, the incremental data is obtained by filtering, through the pre-trained neural network based on the predetermined filtering rule, the preprocessed vehicle driving data, and the incremental data is stored, or is transmitted to the cloud, to train the neural network. With the scheme of the present disclosure, it is possible to effectively filter the high-value incremental data, thereby reducing the requirements for data storage volume and/or the data transmission bandwidth of the system. The system of the present disclosure may be post-mounted or pre-mounted on the vehicle, and is independent of the specific vehicle type of the vehicle. In addition, it is not necessary for the vehicle to be equipped with real-value systems such as high-cost laser radars, which greatly improves the use convenience of the system and facilitates the rapid and large-scale application.

Further, according to the embodiments of the present disclosure, the collected vehicle driving data is filtered through the at least one of the comparison and filtering rule for the high-precision map and the sensed data, the comparison and filtering rule for the prediction data and the sensed data, the filtering rule for the cloud instruction, and the filtering rule for the adjacent frame image difference. Thus, more accurate and more valuable incremental data can be obtained, thereby significantly reducing the sensed data storage volume or the sensed data transmission volume.

Further, according to the embodiments of the present disclosure, the neural network of the sensed decision-making system for the automatic driving is trained with the filtered incremental data, and the pre-trained neural network is updated by deploying the trained neural network for data collection and filtering, to form the closed-loop management of the incremental data targeted at improving the sensed capability of the neural network.

The above description is merely an overview of the technical solutions of the present disclosure. In order to more clearly understand the technical means of the present disclosure, the technical solutions to implement them based on the disclosure of the description and to clarify and explain the above and other objects, features, and advantages of the present disclosure, specific embodiments of the present disclosure will be further described in detail.

The specific embodiments of the present disclosure will be described in detail below in conjunction with the accompanying drawings, and the above and other objects, advantages, and features of the present disclosure would become more apparent to those skilled in the art.

BRIEF DESCRIPTION OF THE DRAWINGS

Some specific embodiments of the present disclosure will hereinafter be described in detail with reference to the accompanying drawings that are exemplary merely, rather than limiting the present disclosure. In the accompanying drawings, same or similar components or parts are denoted by same reference numerals. It should be understood by those skilled in the art that these accompanying drawings are not necessarily drawn to scale, in which:

FIG. 3 is a schematic flowchart of a method for automatic driving data collection and closed-loop management according to yet another embodiment of the present disclosure;

FIG. 4 is a schematic flowchart of a method for automatic driving data collection and closed-loop management according to still yet another embodiment of the present disclosure;

DETAILED DESCRIPTION

Exemplary embodiments of the present disclosure will be described in more detail below with reference to the accompanying drawings. While the exemplary embodiments of the present disclosure are illustrated in the accompanying drawings, it should be understood that the present disclosure may be embodied in various forms and should not be construed as being limited to the embodiments set forth herein. Instead, these embodiments are provided for a complete and thorough understanding of the present disclosure, and can fully convey the scope of the present disclosure to those skilled in the art.

Currently, most sensing modules of an automatic driving system use a DNN to perform target detection, target recognition, target classification, and target prediction. The key to currently large-scale deployment of autonomous vehicles is to improve a performance index of DNN by continuously optimizing and iterating a DNN of a sensed and decision-making system through actual data and enhance robustness and stability of the automatic driving system for various scenes. At present, most enterprises and scientific research institutions usually use special data collection vehicles or test vehicles to perform centralized data collection. Such data collection vehicles generally need to be equipped with a true value system such as a laser radar, and have high requirements for equipment and no filtering mechanism designed or no clear filtering mechanism during data collection, resulting in a large demand for a data storage space or a data transmission bandwidth, which not only places high demands on a hardware system, but also enhances difficulty for subsequent data mining and valuable data searching.

In view of the above, according to the embodiments of the present disclosure, provided is a method and system for automatic driving data collection and closed-loop management, which can be applied in a vehicle.

Figure 1:
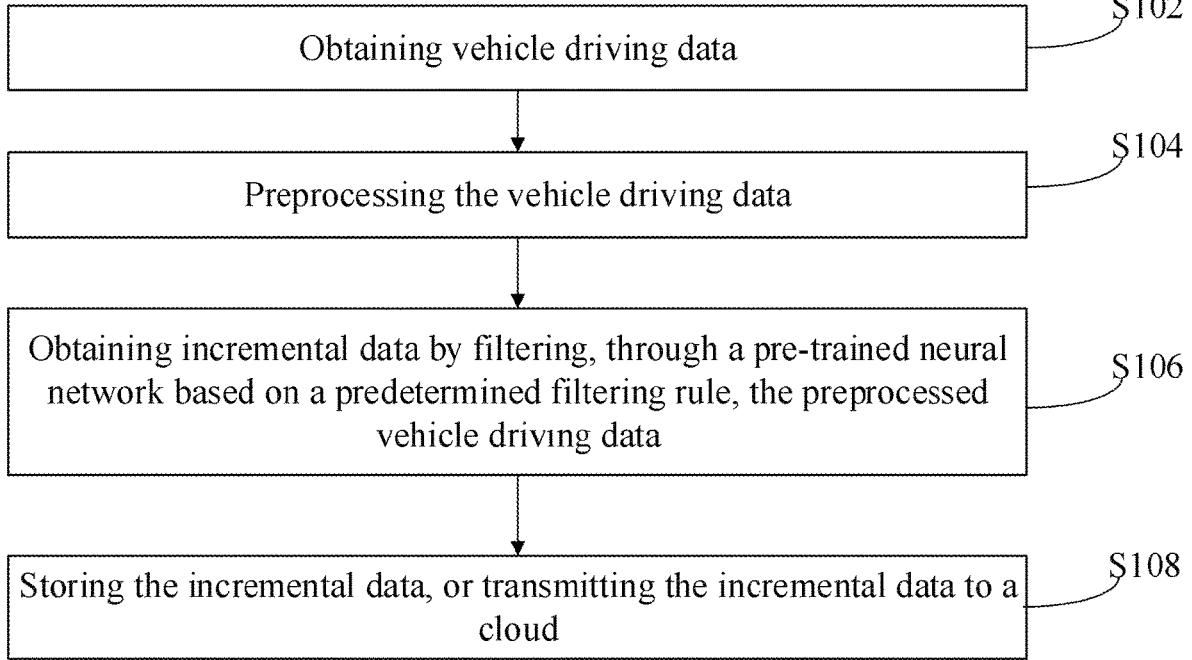
FIG. 1 is a schematic flowchart of a method for automatic driving data collection and closed-loop management according to an embodiment of the present disclosure.

FIG. 1 is a schematic flowchart of a method for automatic driving data collection and closed-loop management according to an embodiment of the present disclosure. As illustrated in FIG. 1, the method for the automatic driving data collection and closed-loop management at least includes operations at blocks S102 to S108.

At block S102, vehicle driving data is obtained.

At block S104, the vehicle driving data is preprocessed.

At block S106, incremental data is obtained by filtering, through a pre-trained neural network based on a predetermined filtering rule, the preprocessed vehicle driving data.

At block S108, the incremental data is stored, or the incremental data is transmitted to a cloud.

In some embodiments, at block S108, the incremental data is stored locally (i.e., stored in a vehicle-end memory), and then the incremental data stored locally is periodically copied and transferred to the cloud (for example, a cloud computing center) for subsequent data processing and neural network training. In one embodiment, the incremental data may also be directly transmitted to the cloud through a network communication module (such as a T-Box) for the subsequent data processing and neural network training. In some embodiments, the incremental data may also be locally stored and uploaded to the cloud at the same time, thereby achieving a plurality of backups and ensuring that the data is not lost.

According to the embodiments of the present disclosure, the method for the automatic driving data collection and closed-loop management can effectively filter high-value incremental data in a distributed incremental data collection manner, thereby reducing the requirements for data storage volume and/or data transmission bandwidth of the system.

Figure 2:
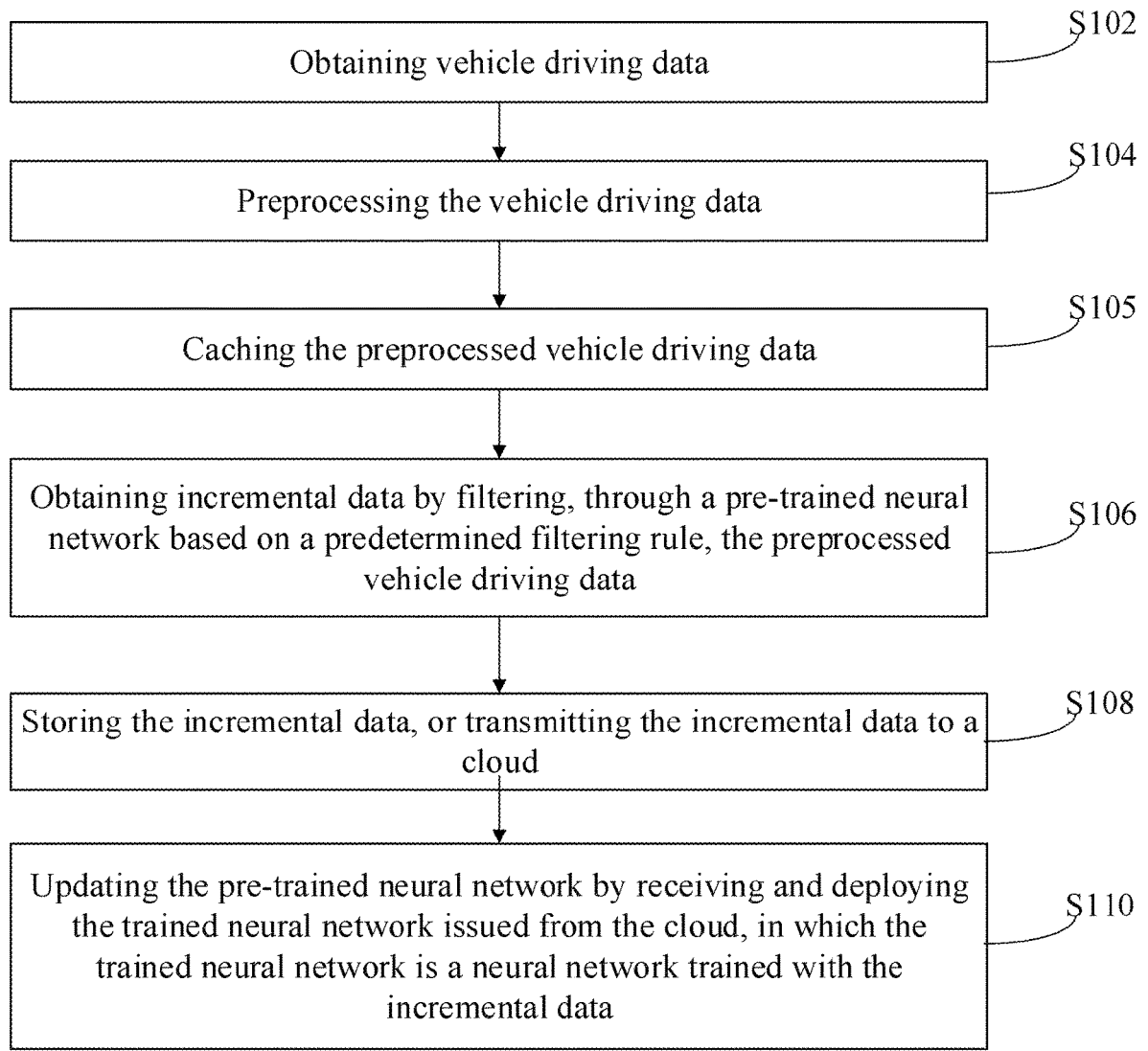
FIG. 2 is a schematic flowchart of a method for automatic driving data collection and closed-loop management according to another embodiment of the present disclosure.

In an embodiment, as illustrated in FIG. 2, after the operation at block S108 is performed, an operation at block S110 is performed and includes: updating the pre-trained neural network by receiving and deploying the trained neural network issued from the cloud, in which the trained neural network is a neural network trained with the incremental data. In some embodiments, the trained neural network issued by the cloud is received via the T-Box configured by the vehicle in an Over-The-Air (OTA) manner. In this embodiment, a neural network of a sensed decision-making system of automatic driving is trained with the filtered incremental data, and the pre-trained neural network is updated by deploying the trained neural network for data collection and filtering, to form closed-loop management of the incremental data targeted at enhancing a neural network sensed capability.

In an embodiment, the incremental data stored locally can be periodically copied to the cloud computing center. After the incremental data is analyzed and marked, incremental training is performed on the neural network by means of the marked incremental data to obtain the trained neural network. In another embodiment, after the incremental data is transmitted to the cloud, the incremental data can be directly analyzed and marked, and the incremental training is performed on the neural network by using the marked data, to obtain the trained neural network. The filtered incremental data is analyzed and marked, which can effectively improve data processing efficiency. On this basis, the incremental training of the neural network is performed using the marked data, which can effectively improve a performance index, training efficiency, and learning efficiency of the neural network.

In another embodiment, further as illustrated in FIG. 2, before the operation at block S106 is performed, the operation at block S105 is performed first, and includes caching the preprocessed vehicle driving data. In some embodiments, the pre-processed vehicle driving data obtained within a predetermined duration (such as 5 minutes) is cached, to perform data filtering at block S106 within enough duration.

In the field of automatic driving, the vehicle driving data includes vehicle sensed data or vehicle control data. The method for collection and closed-loop management of two types of data will be described below.

For the vehicle sensed data, sensed decision-making is performed by using a DNN based on the vehicle sensed data. In an embodiment, as illustrated in FIG. 3, the above operation at block S102 may be implemented below.

At block S302, the vehicle driving data is obtained, and the vehicle driving data includes vehicle sensed data. The vehicle sensed data may include vehicle-mounted visual sensed data, i.e., sensed data such as images and videos obtained by a visual system (for example, one or more cameras) configured on the vehicle.

In this case, the above operation at block S104 may for example include an operation at block S304: performing on the vehicle-mounted visual sensed data at least one of deformation recovery processing, noise reduction processing, deblurring processing, white balance processing, and image complementing and recovery processing under strong light or weak light condition, to enhance definition and accuracy of the vehicle-mounted visual sensed data.

Further, the vehicle sensed data further includes vehicle navigation data and vehicle state data. In some embodiments, the vehicle navigation data can be obtained by a navigation device configured in the vehicle, and the vehicle state data can be obtained from various sensors (such as a speed sensor and an acceleration sensor) and/or an instrument of the vehicle through a vehicle network device of the vehicle. In this case, the operation at block S104 further includes the operation at block S306: forming structured vehicle sensed data by performing time synchronization on the vehicle-mounted visual sensed data, the vehicle navigation data, and the vehicle state data, in which each of the structured vehicle sensed data includes a timestamp, a current sensed image, a current vehicle position, and a current vehicle dynamic parameter. The vehicle dynamic parameters include a vehicle speed, a steering wheel angle, acceleration/deceleration, and the like. When the time synchronization is performed on the vehicle-mounted visual sensed data, the vehicle navigation data, and the vehicle state data, a navigation system clock of the vehicle or a system clock of the system for data collection and closed-loop management used for implementing the method is used as a time reference.

Further, for the pre-processed vehicle sensed data, an operation at block S308 is performed. The incremental data is obtained by filtering, through the pre-trained deep neural network based on the predetermined filtering rule, the pre-processed vehicle sensed data. The predetermined filtering rule includes at least one of the comparison and filtering rule for the high-precision map and the sensed data, the comparison and filtering rule for the prediction data and the sensed data, the filtering rule for the cloud instruction, and the filtering rule for the adjacent frame image difference. Descriptions of the above four predetermined filtering rules will be described below.

The comparison and filtering rule for the high-precision map and the sensed data will be described below. In the comparison and filtering rule for the high-precision map and the sensed data, the structured vehicle sensed data in each of the future frames is identified by running the pre-trained neural network (for example, the DNN), to obtain identification data. It is determined whether current identification data includes a marked target road infrastructure in the high precision map, in response to a forward distance of the vehicle from the marked target road infrastructure being smaller than a first threshold. Structured vehicle sensed data of a predetermined number of frames is determined as the incremental data, in response to determining that the current identification data includes no marked target road infrastructure in the high precision map, and the structured vehicle sensed data of the predetermined number of frames includes previous structured vehicle sensed data and subsequent structured vehicle sensed data that are directly adjacent to current structured vehicle sensed data. In some embodiments, the high-precision map (HD-MAP) can be imported by the navigation device configured by the vehicle, and a road infrastructure (such as a traffic light rod and a static road obstruction) is marked in the HD-MAP. The first threshold may be set according to actual application requirements, for example, is set as 50 m. The predetermined number may be set based on a precision requirement of the actual application, for example, may be set as 20. In this case, structured vehicle sensed data of 20 frames including previous structured vehicle sensed data and subsequent structured vehicle sensed data that are directly adjacent to the current structured vehicle sensed data is determined as the incremental data. In this way, the method is applicable in comparative filtering of static data, can filter vehicle sensed data that is not be accurately recognized by the DNN, and is more effective for training the DNN and improving a sensed capability of the DNN.

The comparison and filtering rule for the prediction data and the sensed data will be described below. The comparison and filtering rule for the prediction data and the sensed data includes: predicting a first position of an obstacle vehicle in a first number of future frames starting from a current moment, and obtaining an actually sensed second position of the obstacle vehicle in a second number of future frames starting from the current moment by the pre-trained neural network based on structured vehicle sensed data of the second number of future frames starting from the current moment, in which the second number is greater than or equal to the first number. Then, it is determined whether the prediction data is same as the sensed data based on the first position in each of the future frames and the second position in a corresponding frame. Structured vehicle sensed data of a predetermined number of frames is determined as the incremental data in response to determining that the sensed data is different from the sensed data based on the first position in each of the future frames and the second position in a corresponding frame, and the structured vehicle sensed data of the predetermined number of frames includes previous structured vehicle sensed data and subsequent structured vehicle sensed data that are directly adjacent to current structured vehicle sensed data.

In some embodiments, a future trajectory and a future position of the obstacle vehicle may be predicted using methods such as vehicle kinematics and Long Short-Term Memory (LSTM). It is determined whether the prediction data is same as the sensed data in the following manners. Firstly, a distance difference d between the prediction data and the sensed data is calculated by a formula (1):

$$d = \frac{1}{n}\sum_{i=1}^{n}\left(X_i^{real} - X_i^{pred}\right)^2 + \left(Y_i^{real} - Y_i^{pred}\right)^2, \qquad (1)$$

where $$\left(X_i^{real},\ Y_i^{real}\right)$$

represents an actually sensed second position of an obstacle vehicle in an i-th future frame, $$\left(X_i^{pred},\ Y_i^{pred}\right)$$

represents a predicted first position of the obstacle vehicle in the i-th future frame, and n is equal to the first number. Then, it is determined whether the distance difference d is greater than a second threshold dmin. It can be determined that the prediction data is different from the sensed data in response to determining that the distance difference d is greater than the second threshold dmin.

The first number and the second number may be set according to the actual application requirements. For example, the first number is generally set as 8 frames, and the second number is set as 20 frames. In response to predicting that the obstacle vehicle is exceed a sensed field of the visual system of the vehicle in 8 future frames, the first number may be set as the number of frames of the sensed field of the visual system. In addition, when frame leakage of the obstacle vehicle is detected within the sensed field, $$\left(X_i^{real},\ Y_i^{real}\right)$$

of the frame is set as a large value (for example, 1000), to ensure that the sensed data can be filtered. The second threshold dmin may be set based on the actual application. The embodiments of the present disclosure is not limited thereto.

This method can be applied in filtering of sensed data having no true value, can filter the vehicle sensed data different from the sensed data, and is more effective for training the DNN and improving the sensed capability of the DNN.

The filtering rule for the cloud instruction will be described below. In the filtering rule for the cloud instruction, the incremental data is obtained by filtering, based on a data filtering instruction issued from the cloud, the structured vehicle sensed data. In some embodiments, according to training requirements of the DNN, a data filtering instruction (such as collecting vehicle sensed data when braking deceleration is greater than a threshold and vehicle sensed data at a traffic light intersection) is set at the cloud, and is transmitted to the vehicle by means of the T-box, and the vehicle performs the data filtering instruction received from the cloud. In this way, the incremental data required for neural network training can be filtered in a targeted manner, and the data processing efficiency and the training efficiency of neural network can be improved.

The filtering rule for the adjacent frame image difference will be described below. The filtering rule for the adjacent frame image difference includes: calculating a difference index between sensed images in structured vehicle sensed data in a previous frame and a subsequent frame that are adjacent to each other; determining whether the difference index is greater than a third threshold; and determining structured vehicle sensed data of a predetermined number of frames as the incremental data in response to determining that the difference index is greater than the third threshold, in which the structured vehicle sensed data of the predetermined number of frames includes previous structured vehicle sensed data and subsequent structured vehicle sensed data that are directly adjacent to the structured vehicle sensed data in the subsequent frame. The third threshold may be set according to the actual application requirements. The embodiment of the present disclosure is not limited thereto. The predetermined number is set as described above. For example, when the predetermined number is set as 20, and the difference index between the sensed images in the structured vehicle sensed data in the previous frame and the subsequent frame that are adjacent to each other is greater than the third threshold. The structured vehicle sensed data of 20 frames including previous structured vehicle sensed data and subsequent structured vehicle sensed data that are directly adjacent to the structured vehicle sensed data in the subsequent frame is determined as the incremental data.

In some embodiments, the difference index is a mean square error (MSE) or structural similarity (SSIM) between the two sensed images.

For the MSE, a MSE between the sensed images in the structured vehicle sensed data in the previous frame and the subsequent frame is calculated by a formula (2):

$$MSE = \frac{1}{mn}\sum_{i=0}^{m-1}\sum_{j=0}^{n-1}[I_t(i, j) - I_{t+1}(i, j)]^2, \qquad (2)$$

where $I_t(i,j)$ represents a pixel value of sensed images in frames at a t moment, $I_{t+1}(i,j)$ represent a pixel value of sensed images in frames at a t+1 moment, i and j represent pixel point coordinates of the sensed image, respectively, and m and n represent a length and a width of the sensed image.

For the SSIM, an SSIM between the sensed images in the structured vehicle sensed data in the previous frame and the subsequent frame is calculated by a formula (3):

$$SSIM(x, y) = \frac{(2\mu_x\mu_y + c_1)(2\sigma_{xy} + c_2)}{\left(\mu_x^2 + \mu_y^2 + c_1\right)\left(\sigma_x^2 + \sigma_y^2 + c_2\right)}, \qquad (3)$$

where x and y represent pixel values of sensed images in two adjacent frames, $\mu_x$ represents a mean value of x, $\mu_y$ represents a mean value of y, $\sigma_x$ represents a variance of x, $\sigma_y$ represent a variance of y, $\sigma_{xy}$ represents a covariance of x and y, and $c_1$ and $c_2$ are constants that maintain stability, $c_1=(k_1*L)^2$, $c_2=(k_2*L)^2$, where $k_1$ and $k_2$ are constants, and L represents a dynamic range of the pixel values. Generally, $k_1=0.01$, $k_2=0.03$.

When there is a significant difference between the images in the previous frame and the subsequent frame, it is indicated that the vehicle enters a new scene or new environment, and the vehicle sensed data has a high value at this time. In this way, the vehicle sensed data of the adjacent frame image with difference exceeding the threshold is filtered for the neural network training, which can more effectively improve the sensed capability of the DNN.

The operation at block S310 are the same as the above operation at block S108, and details thereof will be omitted herein.

According to this embodiment, the collected vehicle driving data is filtered through at least one of the comparison and filtering rule for the HD-MAP and the sensed data, the comparison and filtering rule for the prediction data and the sensed data, the filtering rule for the cloud instruction, and the filtering rule for the adjacent frame image difference, which can obtain more accurate and more valuable incremental data, thereby greatly reducing a sensed data storage volume of or a sensed data transmission volume.

Fort the vehicle control data, a Deep Reinforcement Learning (DRL) neural network is used for sensed decision-making. In an embodiment, as illustrated in FIG. 4, the method for the automatic driving data collection and closed-loop management may include operations at blocks S402 to S416.

At block S402, the vehicle control data is obtained. The vehicle control data includes current vehicle state data $S_t$ and a current control action $a_{human}$ from a driver of the vehicle.

In some embodiments, the current vehicle state data $S_t$ includes current environment information (such as image information and a grid map), a current vehicle speed, a current vehicle steering angle, and the like. The current control action $a_{human}$ from the driver includes a first decision instruction, a steering angle, an accelerator pedal/brake pedal opening degree, and the like. The vehicle control data may be obtained by the visual system (such as the camera) configured on the vehicle, the navigation device, the vehicle network device, and the like.

At block S404, the vehicle control data is preprocessed.

In this block, the vehicle control data may be preprocessed in an existing common processing manner, which may be for example selected based on actual applications, and details thereof will be omitted herein.

In a case where the vehicle control data is filtered, the operation at block S106 may be further implemented as operations at blocks S406 to S414.

At block S406, a current control action $a_{nn}$ output is collected by a pre-trained DRL neural network based on the current vehicle state data $S_t$.

The current control action $a_{nn}$ output by the DRL neural network includes a second decision instruction, a steering instruction, a speed instruction, and the like.

At block S408, a difference between the current control action $a_{nn}$ output by the DRL neural network and the current control action $a_{human}$ from the driver is calculated.

The difference calculation in the operation at this block should be conceivable for those skilled in the art, and details thereof will be omitted herein.

At block S410, it is determined whether the difference is greater than a fourth threshold. An operation at block S412 is performed in response to determining that the difference is greater than the fourth threshold.

At block S412, a rewarding and punishing function value r(t) of the DRL neural network is determined based on the current vehicle state data $S_t$ and the current control action $a_{nn}$ output by the deep reinforcement learning neural network.

In some embodiments, the rewarding and punishing function value r(t) of the DRL neural network is calculated by a formula (4):

$$r(t)=R_{ca}(t)+b_1R_{ma}(t)+b_2R_{lk}(t)+b_3R_{speed}(t)+b_4R_{steer}(t) \qquad (4),$$

where $R_{ca}(t)$ represents to a collision avoidance index, $R_{ma}(t)$ represents a mission achievement index, $R_{lk}(t)$ represents a lane keeping capability index, $R_{speed}(t)$ represents a speed rationality index, $R_{steer}(t)$ represents a steering rationality index, $R_{ca}(t)$, $R_{ma}(t)$, $R_{lk}(t)$, $R_{speed}(t)$, and $R_{steer}(t)$ are obtained by applying the current control action $a_{nn}$ output by the deep reinforcement learning neural network to a control system of the vehicle based on the current vehicle state data $S_t$, and $b_1$, $b_2$, $b_3$, and $b_4$ represent weight coefficients, respectively. Each of the weight coefficients represents a degree of attention to the corresponding index, and may be set as experienced.

At block S414, a data packet is determined as the incremental data. The data packet is constructed based on the current vehicle state data $S_t$, the current control action $a_{nn}$ output by the deep reinforcement learning neural network, the current control action $a_{human}$ from the driver, the rewarding and punishing function value r(t)), and vehicle state data $S_{t+1}$ at a next moment.

The vehicle state data $S_{t+1}$ at the next moment refers to state data converted by the current vehicle state data $S_t$ after the vehicle is applied with the current control action $a_{human}$ from the driver. The data packet form constructed by the operation at this block may be $[S_t, a_{nn}, a_{human}, r(t), S_{t+1}]$.

At block S416, the incremental data is stored, or the incremental data is transmitted to the cloud.

The operation at block S416 are the same as the above operation at block S108, and details thereof will be omitted herein.

Further, after the operation at block S416 is performed, the pre-trained DRL neural network is updated by receiving and deploying the trained DRL neural network issued from the cloud. The trained DRL neural network is a DRL neural network trained with the incremental data of the filtered vehicle control data.

In this embodiment, incremental data collection and closed-loop management are performed on the vehicle control data, which can greatly reduce the requirements for data storage volume and/or the data transmission bandwidth of the system, enhance the data processing efficiency, and improve the sensed decision-making capability of the DRL neural network.

Figure 5:
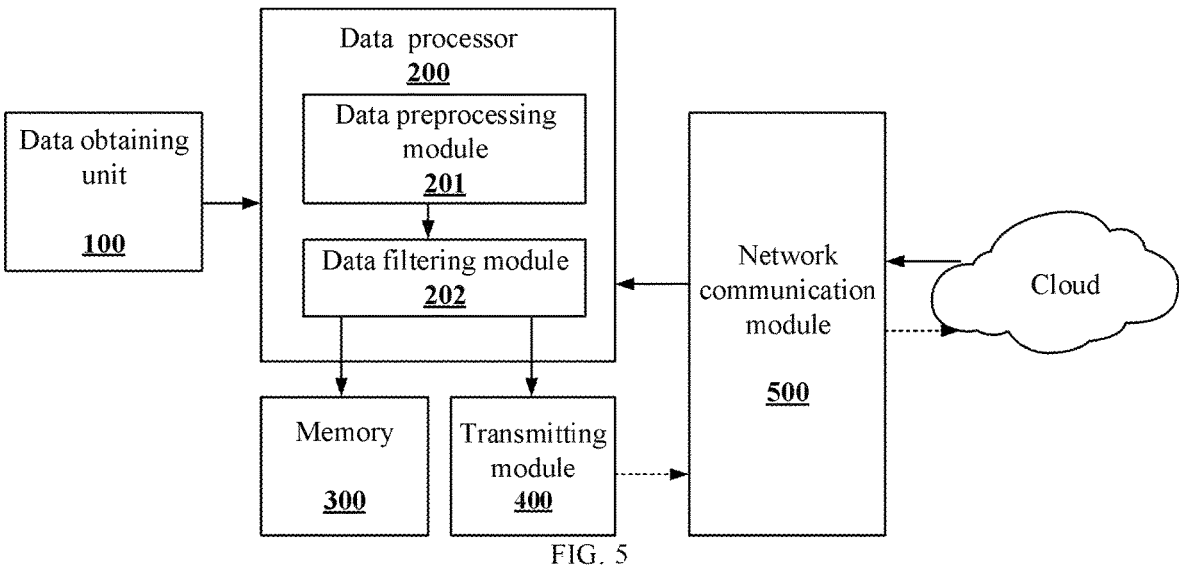
FIG. 5 is a schematic structural diagram of a system for automatic driving data collection and closed-loop management according to an embodiment of the present disclosure.

Based on the same technical concept, embodiments of the present disclosure further provide a system for automatic driving data collection and closed-loop management, applied in a vehicle. FIG. 5 is a schematic structural diagram of a system 10 for automatic driving data collection and closed-loop management according to an embodiment of the present disclosure. As illustrated in FIG. 5, the system 10 for the automatic driving data collection and closed-loop management may at least include a data obtaining unit 100 and a data processor 200. The data obtaining unit 100 is configured to obtain vehicle driving data. The data processor 200 may include a data preprocessing module 201 and a data filtering module 202. The data preprocessing module 201 is configured to preprocess the vehicle driving data. The pre-trained neural network is deployed on the data filtering module 202, and the data filtering module 202 is configured to obtain the incremental data by filtering, through the pre-trained neural network based on the predetermined filtering rule, the preprocessed vehicle driving data. The data processor 200 may be a graphics processing unit (GPU) capable of running the neural network (such as the DNN). The system 10 for the automatic driving data collection and closed-loop management may further include a memory 300 configured to store the incremental data, and/or, a transmitting module 400 configured to transmit the incremental data to the cloud. In some embodiments, the transmitting module 400 can transmit the incremental data to the cloud through a network communication module 500, which for example may be the T-BOX, and the like.

In an embodiment, the data filtering module 202 is further configured to update the pre-trained neural network by receiving and deploying the trained neural network issued from the cloud. The trained neural network is a neural network trained with the incremental data.

Figure 6:
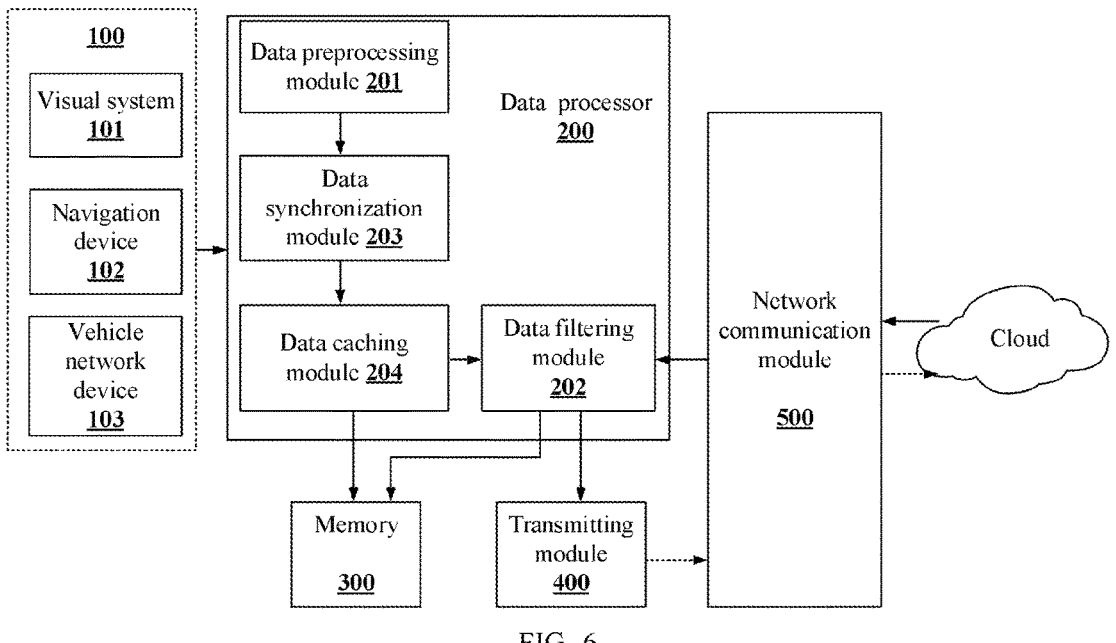
FIG. 6 is a schematic structural diagram of a system for automatic driving data collection and closed-loop management according to another embodiment of the present disclosure.

In an embodiment, as illustrated in FIG. 6, the data obtaining unit 100 includes a visual system 101 (for example, one or more vehicle-mounted cameras) configured to obtain vehicle-mounted visual sensed data. Correspondingly, the data preprocessing module 201 is further configured to perform on the vehicle-mounted visual sensed data at least one of deformation recovery processing, noise reduction processing, deblurring processing, white balance processing, and image complementing and recovery processing under strong light or weak light condition.

In an embodiment, with continued reference to FIG. 6, the data obtaining unit 100 further includes a navigation device 102 and a vehicle network device 103. The navigation device 102 may be, for example, a combined navigation system configured to obtain the vehicle navigation data. The vehicle network device 103 may be, for example, a vehicle-mounted CAN network bus, a vehicle-mounted Ethernet bus, and the like, which can obtain the vehicle state data from various sensors (such as vehicle speed sensors and acceleration sensors) and/or instruments of the vehicle by means of the vehicle network device 103. The data processor 200 may further include a data synchronization module 203 configured to form structured vehicle sensed data by performing time synchronization on the vehicle-mounted visual sensed data, the vehicle navigation data, and the vehicle state data. Each of the structured vehicle sensed data includes a timestamp, a current sensed image, a current vehicle position, and a current vehicle dynamic parameter.

In an embodiment, with continued reference to FIG. 6, the data processor 200 may further include a data caching module 204 configured to cache the preprocessed vehicle driving data.

In an embodiment, the memory 300 is a vehicle-mounted mobile hard disk. The vehicle-mounted mobile hard disk has a large capacity, can store a large quantity of incremental data obtained by filtering, and then can bulk copy and transfer the incremental data to the cloud computing center, enabling the image data or video data collected by the system to be transmitted independent of a bandwidth of a wireless network.

In an implementation, the data filtering module 202 may be configured to perform the data filtering operation described in any of the above embodiments or combinations thereof, and details thereof will be omitted herein.

According to the embodiments of the present disclosure, the system 10 for the automatic driving data collection and closed-loop management may be pre-mounted on the vehicle (i.e., mounted during vehicle production) or post-mounted (i.e., mounted after the vehicle leaves the factory), and is independent of the specific vehicle type. In addition, it is not necessary for the vehicle to be equipped with real-value systems such as high-cost laser radars. Moreover, image and video data transmission is independent of the bandwidth of the wireless network, which significantly improves use convenience of the system and facilitates rapid and large-scale application of the system 10 for the automatic driving data collection and closed-loop management.

According to the present disclosure, various implementations of the method and system for the automatic driving data collection and closed-loop management are described in detail above, and the implementations of the present disclosure are described below through some embodiments.

In one embodiment, the system 10 for the automatic driving data collection and closed-loop management is a pre-mounted system. Compared with FIG. 6, in the system 10 for the automatic driving data collection and closed-loop management, the transmitted module 400 removed, the visual system 101 adopts one or more cameras, and the memory 300 is the vehicle-mounted mobile hard disk. During application, the visual sensed data obtained by the camera, the vehicle navigation data obtained by the navigation device 102, and the vehicle state data obtained by the vehicle network device 103 are input of the data processor 200. The pre-trained DNN is deployed in the data filtering module 202 of the data processor 200, and can be upgraded in an OTA manner. After the input data is pre-processed and synchronized by the data preprocessing module 201 and the data synchronization module 203, the data filtering module 202 performs data filtering through rules such as the comparison and filtering rule for the HD-MAP and the sensed data, the comparison and filtering rule for the prediction data and the sensed data, the filtering rule for the cloud instruction, and the filtering rule for the adjacent frame image difference, and stores the filtered structured sensed data to the vehicle-mounted mobile hard disk. In the pre-mounted system, DNN result output in the data processor 200 may also be used as one of input sources of an intelligent driving system of the vehicle to improve a reuse rate of the system.

After the system 10 for the automatic driving data collection and closed-loop management is deployed on a large scale, the incremental data is collected and filtered by the vehicle in different scenes. The incremental data collected and filtered by the vehicle is first data-processed and classified in a computing center. Further, a scene classification may be performed on the basis of information such as positions, vehicle speeds, and accelerations. In some embodiments, the data under the specific condition may also be collected according to a filtering instruction condition set at the cloud. Then, the incremental data is marked, and the marked incremental data is used for performing algorithm incremental training and DNN performance improvement on the DNN. Finally, an iteratively updated DNN network is periodically deployed to the data processor 200 of the vehicle in an OTA manner, and then new round of incremental data collection is performed, thereby forming a data collection and closed-loop management system.

In one embodiment, the method and system for the automatic driving data collection and closed-loop management in this embodiment are used for controlling the collection of incremental data for the automatic driving to train the DRL neural network.

In this embodiment, the system 10 for the automatic driving data collection and closed-loop management is mounted on an automatic driving test vehicle, and the pre-trained DRL neural network is deployed in the data processor 200 mounted on the automatic driving test vehicle. The deployed DRL neural network is run in the background. That is, an action output by the DRL neural network does not directly act on real vehicle control.

During application, the system 10 for the automatic driving data collection and closed-loop management can detect the difference between the action output by the DRL neural network and the action from the driver, to obtain incremental control data having a difference exceeding the fourth threshold, and the incremental control data is stored as a data packet $[S_t, a_{nn}, a_{human}, r, S_{t+1}]$. The calculation and determination of the difference between the output action of the DRL neural network and the action from the driver, and the construction of the data packet of the incremental control data are described as described above, and details thereof will be omitted herein.

After the incremental control data is obtained, the DRL neural network is trained with the incremental control data. The trained DRL neural network is periodically deployed into the test vehicle in an OTA manner, to form an incremental data closed-loop management system targeted at improving a DRL neural network control capability KPI.

According to any one of embodiments or a combination thereof, the embodiments of the present disclosure have the following beneficial effects.

In the method and system for the automatic driving data collection and closed-loop management according to the embodiments of the present disclosure, the incremental data is obtained by filtering, through the pre-trained neural network based on the predetermined filtering rule, the preprocessed vehicle driving data, and the incremental data is stored, or is transmitted to the cloud, to train the neural network. With the scheme of the present disclosure, it is possible to effectively filter the high-value incremental data, thereby reducing the requirements for data storage volume and/or the data transmission bandwidth of the system. The system of the present disclosure may be post-mounted or pre-mounted on the vehicle, and is independent of the specific vehicle type of the vehicle. In addition, it is not necessary for the vehicle to be equipped with real-value systems such as high-cost laser radars, which greatly improves the use convenience of the system and facilitates the rapid and large-scale application.

Further, according to the embodiments of the present disclosure, the collected vehicle driving data is filtered through at least one of the comparison and filtering rule for the high-precision map and the sensed data, the comparison and filtering rule for the prediction data and the sensed data, the filtering rule for the cloud instruction, and the filtering rule for the adjacent frame image difference. Thus, more accurate and more valuable incremental data can be obtained, thereby significantly reducing the sensed data storage volume or the sensed data transmission volume.

Further, according to the embodiments of the present disclosure, the neural network of the sensed decision-making system for the automatic driving is trained with the filtered incremental data, and the pre-trained neural network is updated by deploying the trained neural network for data collection and filtering, to form the closed-loop management of the incremental data targeted at improving the sensed capability of the neural network.

Although exemplary embodiments of the present disclosure have been illustrated and described in detail herein, it is conceivable for those skilled in the art that various modifications and variations can be directly determined or derived based on the disclosure of the present disclosure without departing from the principles and spirits of the present disclosure. Therefore, the scope of the present disclosure shall be understood and considered to cover all these variations or modifications and other variations or modifications.

What is claimed is:

1. A method for automatic driving data collection and closed-loop management, applied in a vehicle, the method comprising:

obtaining vehicle driving data;

preprocessing the vehicle driving data;

obtaining incremental data by filtering, through a pre-trained neural network based on a predetermined filtering rule, the preprocessed vehicle driving data; and storing the incremental data, or transmitting the incremental data to a cloud, wherein the vehicle driving data comprises vehicle sensed data, and the predetermined filtering rule comprises a comparison and filtering rule for a high-precision map and sensed data, a comparison and filtering rule for prediction data and sensed data, and a filtering rule for adjacent frame image difference, the comparison and filtering rule for the high-precision map and the sensed data comprises determining whether current identification data comprises a marked target road infrastructure in the high precision map to determine the incremental data;

the comparison and filtering rule for the predication data and the sensed data comprises determining whether the predication data is same as the sensed data based on a predicted first position of an obstacle vehicle and an actually sensed second position of the obstacle vehicle to determine the incremental data; and the filtering rule for the adjacent frame image difference comprises determining whether a difference index between sensed images in adjacent frames is greater than a third threshold to determine the incremental data, or, wherein the vehicle driving data comprises vehicle control data, and the vehicle control data comprises current vehicle state data $S_t$ and a current control action $a_{human}$ from a driver of the vehicle, said obtaining the incremental data by filtering, through the pre-trained neural network based on the predetermined filtering rule, the preprocessed vehicle driving data comprises:

collecting a current control action $a_{nn}$ output, based on the current vehicle state data $S_t$, by a pre-trained deep reinforcement learning neural network;

calculating a difference between the current control action $a_{nn}$ output by the deep reinforcement learning neural network and the current control action $a_{human}$ from the driver;

determining whether the difference is greater than a fourth threshold;

determining a rewarding and punishing function value $r(t)$ of the deep reinforcement learning neural network based on the current vehicle state data $S_t$ and the current control action $a_{nn}$ output by the deep reinforcement learning neural network, in response to determining that the difference is greater than the fourth threshold; and determining a data packet as the incremental data, the data packet being constructed based on the current vehicle state data $S_t$, the current control action $a_{nn}$ output by the deep reinforcement learning neural network, the current control action $a_{human}$ from the driver, the rewarding and punishing function value r(t), and vehicle state data $S_{t+1}$ at a next moment.

2. The method according to claim 1, further comprising, subsequent to storing the incremental data:

updating the pre-trained neural network by receiving and deploying a trained neural network issued from the cloud, wherein the trained neural network is a neural network trained with the incremental data.

3. The method according to claim 1, wherein:

in case that the vehicle driving data comprises the vehicle sensed data, the neural network is a deep neural network.

4. The method according to claim 3, wherein:

the vehicle sensed data comprises vehicle-mounted visual sensed data; and said preprocessing the vehicle driving data comprises:

performing on the vehicle-mounted visual sensed data at least one of deformation recovery processing, noise reduction processing, deblurring processing, white balance processing, and image complementing and recovery processing under strong light or weak light condition.

5. The method according to claim 4, wherein:

the vehicle sensed data further comprises vehicle navigation data and vehicle state data; and said preprocessing the vehicle driving data further comprises:

forming structured vehicle sensed data by performing time synchronization on the vehicle-mounted visual sensed data, the vehicle navigation data, and the vehicle state data, each of the structured vehicle sensed data comprising a timestamp, a current sensed image, a current vehicle position, and a current vehicle dynamic parameter.

6. The method according to claim 1, wherein the comparison and filtering rule for the high-precision map and the sensed data further comprises:

identifying the structured vehicle sensed data by running the pre-trained neural network to obtain identification data;

determining whether the current identification data comprises the marked target road infrastructure in the high precision map in response to a forward distance of the vehicle from the marked target road infrastructure being smaller than a first threshold; and determining structured vehicle sensed data of a predetermined number of frames as the incremental data in response to determining that the current identification data comprises no marked target road infrastructure in the high precision map, the structured vehicle sensed data of the predetermined number of frames including previous structured vehicle sensed data and subsequent structured vehicle sensed data that are directly adjacent to current structured vehicle sensed data.

7. The method according to claim 1, wherein the comparison and filtering rule for the prediction data and the sensed data further comprises:

predicting a first position of the obstacle vehicle in a first number of future frames starting from a current moment;

obtaining the actually sensed second position of the obstacle vehicle in a second number of future frames starting from the current moment through the pre-trained neural network based on structured vehicle sensed data of the second number of future frames starting from the current moment, the second number being greater than or equal to the first number;

determining whether the prediction data is same as the sensed data based on the first position in each of the future frames and the second position in a corresponding frame; and determining structured vehicle sensed data of a predetermined number of frames as the incremental data in response to determining that the sensed data is different from the sensed data based on the first position in each of the future frames and the second position in a corresponding frame, the structured vehicle sensed data of the predetermined number of frames including previous structured vehicle sensed data and subsequent structured vehicle sensed data that are directly adjacent to current structured vehicle sensed data.

8. The method according to claim 7, wherein said determining whether the prediction data is same as the sensed data based on the first position in each of the future frames and the second position in the corresponding frame comprises:

calculating a distance difference d between the prediction data and the sensed data by a formula (1):

$$d = \frac{1}{n}\sum_{i=1}^{n}\left(X_i^{real} - X_i^{pred}\right)^2 + \left(Y_i^{real} - Y_i^{pred}\right)^2, \tag{1}$$

where $$\left(X_i^{real}, Y_i^{real}\right)$$

represents an actually sensed second position of an obstacle vehicle in an i-th future frame, $$\left(X_i^{pred}, Y_i^{pred}\right)$$

represents a predicted first position of the obstacle vehicle in the i-th future frame, and n is equal to the first number;

determining whether the distance difference d is greater than a second threshold; and determining that the prediction data is different from the sensed data in response to determining that the distance difference d is greater than the second threshold.

9. The method according to claim 1, wherein the filtering rule for the adjacent frame image difference further comprises:

calculating the difference index between the sensed images in structured vehicle sensed data in a previous frame and a subsequent frame that are adjacent to each other;

determining whether the difference index is greater than the third threshold; and determining structured vehicle sensed data of a predetermined number of frames as the incremental data in response to determining that the difference index is greater than the third threshold, the structured vehicle sensed data of the predetermined number of frames including previous structured vehicle sensed data and subsequent structured vehicle sensed data that are directly adjacent to the structured vehicle sensed data in the subsequent frame.

10. The method according to claim 9, wherein:

the difference index is a mean square error, and said calculating the difference index between the sensed images in the structured vehicle sensed data in the previous frame and the subsequent frame that are adjacent to each other comprises: calculating a mean square error between the sensed images in the structured vehicle sensed data in the previous frame and the subsequent frame by a formula (2):

$$MSE = \frac{1}{mn} \sum_{i=0}^{m-1} \sum_{j=0}^{n-1} [I_t(i, j) - I_{t+1}(i, j)]^2, \qquad (2)$$

where $I_t(i,j)$ represents a pixel value of sensed images in frames at a t moment, $I_{t+1}(i,j)$ represent a pixel value of sensed images in frames at a t+1 moment, i and j represent pixel point coordinates of the sensed image, respectively, and m and n represent a length and a width of the sensed image; or the difference index is structural similarity, and said calculating the difference index between the sensed images in the structured vehicle sensed data in the previous frame and the subsequent frame that are adjacent to each other comprises: calculating a structural similarity between the sensed images in the structured vehicle sensed data in the previous frame and the subsequent frame by a formula (3):

$$SSIM(x, y) = \frac{(2\mu_x\mu_y + c_1)(2\sigma_{xy} + c_2)}{(\mu_x^2 + \mu_y^2 + c_1)(\sigma_x^2 + \sigma_y^2 + c_2)}, \qquad (3)$$

where x and y represent pixel values of sensed images in two adjacent frames, $\mu_x$ represents a mean value of x, $\mu_y$ represents a mean value of y, $\sigma_x$ represents a variance of x, $\sigma_y$ represent a variance of y, $\sigma_{xy}$ represents a covariance of x and y; and $c_1$ and $c_2$ are constants that maintain stability, $c_1=(k_1*L)^2$, $c_2=(k_2*L)^2$, where $k_1$ and $k_2$ are constants, and L represents a dynamic range of the pixel values.

11. The method according to claim 1, wherein:

in case that the vehicle driving data comprises the vehicle control data, the neural network is a deep reinforcement learning neural network.

12. The method according to claim 1, wherein said determining the rewarding and punishing function value r(t) of the deep reinforcement learning neural network based on the current vehicle state data $S_t$ and the current control action $a_{nn}$ output by the deep reinforcement learning neural network comprises:

calculating the rewarding and punishing function value r(t) of the deep reinforcement learning neural network by a formula (4):

$$r(t)=R_{ca}(t)+b_1R_{ma}(t)+b_2R_{lk}(t)+b_3R_{speed}(t)+b_4R_{steer}(t) \qquad (4),$$

where $R_{ca}$ (t) represents to a collision avoidance index, $R_{ma}$ (t) represents a mission achievement index, $R_{lk}$ (t) represents a lane keeping capability index, $R_{speed}$ (t) represents a speed rationality index, $R_{steer}$(t) represents a steering rationality index, $R_{ca}$ (t), $R_{ma}$ (t), $R_{lk}$ (t), $R_{speed}$ (t), and $R_{steer}$(t) are obtained by applying the current control action $a_{nn}$ output by the deep reinforcement learning neural network to a control system of the vehicle based on the current vehicle state data $S_t$, and $b_1$, $b_2$, $b_3$, and $b_4$ represent weight coefficients, respectively.

13. The method according to claim 1, wherein:

the current vehicle state data $S_t$ comprises at least one of current environment information, a current vehicle speed, and a current vehicle steering angle;

the current control action $a_{human}$ from the driver comprises at least one of a first decision instruction, a steering angle, and an accelerator pedal/brake pedal opening degree; and the current control action $a_{nn}$ output by the deep reinforcement learning neural network comprises at least one of a second decision instruction, a steering instruction, and a speed instruction.

14. A system for automatic driving data collection and closed-loop management, applied in a vehicle, the system comprising:

a data obtaining unit configured to obtain vehicle driving data;

a data processor comprising:

a data preprocessing module configured to preprocess the vehicle driving data; and a data filtering module, a pre-trained neural network being deployed on the data filtering module, and the data filtering module being configured to obtain incremental data by filtering, through a pre-trained neural network based on a predetermined filtering rule, the preprocessed vehicle driving data; and a memory having the incremental data stored thereon; and/or a transmitting module configured to transmit the incremental data to a cloud, wherein the vehicle driving data comprises visual sensed data, and the predetermined filtering rule comprises a comparison and filtering rule for a high-precision map and sensed data, a comparison and filtering rule for prediction data and sensed data, and a filtering rule for adjacent frame image difference, the comparison and filtering rule for the high-precision map and the sensed data comprises determining whether current identification data comprises a marked target road infrastructure in the high precision map to determine the incremental data;

the comparison and filtering rule for the predication data and the sensed data comprises determining whether the predication data is same as the sensed data based on a predicted first position of an obstacle vehicle and an actually sensed second position of the obstacle vehicle to determine the incremental data; and the filtering rule for the adjacent frame image difference comprises determining whether a difference index between sensed images in adjacent frames is greater than a third threshold to determine the incremental data, or, wherein the vehicle driving data comprises vehicle control data, and the vehicle control data comprises current vehicle state data $S_t$ and a current control action $a_{human}$ from a driver of the vehicle, said obtaining the incremental data by filtering, through the pre-trained neural network based on the predetermined filtering rule, the preprocessed vehicle driving data comprises:

collecting a current control action $a_{nn}$ output, based on the current vehicle state data $S_t$, by a pre-trained deep reinforcement learning neural network;

calculating a difference between the current control action $a_{nn}$ output by the deep reinforcement learning neural network and the current control action $a_{human}$ from the driver;

determining whether the difference is greater than a fourth threshold;

determining a rewarding and punishing function value $r(t)$ of the deep reinforcement learning neural network based on the current vehicle state data $S_t$ and the current control action $a_{nn}$ output by the deep reinforcement learning neural network, in response to determining that the difference is greater than the fourth threshold; and determining a data packet as the incremental data, the data packet being constructed based on the current vehicle state data $S_t$, the current control action $a_{nn}$ output by the deep reinforcement learning neural network, the current control action $a_{human}$ from the driver, the rewarding and punishing function value $r(t)$, and vehicle state data $S_{t+1}$ at a next moment.

15. The system according to claim 14, wherein:

the data filtering module is further configured to update the pre-trained neural network by receiving and deploying the trained neural network issued from the cloud; and the trained neural network is a neural network trained with the incremental data.

16. The system according to claim 14, wherein the vehicle sensed data comprises vehicle-mounted visual sensed data, the data obtaining unit comprises one or more vehicle-mounted cameras configured to obtain the vehicle-mounted visual sensed data; and the data preprocessing module is further configured to perform on the vehicle-mounted visual sensed data at least one of deformation recovery processing, noise reduction processing, deblurring processing, white balance processing, and image complementing and recovery processing under strong light or weak light condition.

17. The system according to claim 16, wherein:

the data obtaining unit further comprises:

a navigation device configured to obtain vehicle navigation data; and a vehicle network device configured to obtain vehicle state data; and the data processor further comprises a data synchronization module configured to form structured vehicle sensed data by performing time synchronization on the vehicle-mounted visual sensed data, the vehicle navigation data, and the vehicle state data, each of the structured vehicle sensed data comprising a timestamp, a current sensed image, a current vehicle position, and a current vehicle dynamic parameter.

\* \* \* \* \*